Sept. 29, 1936.    F. W. MANNING    2,055,869
PROCESS OF FILTRATION
Original Filed March 11, 1932    4 Sheets-Sheet 3
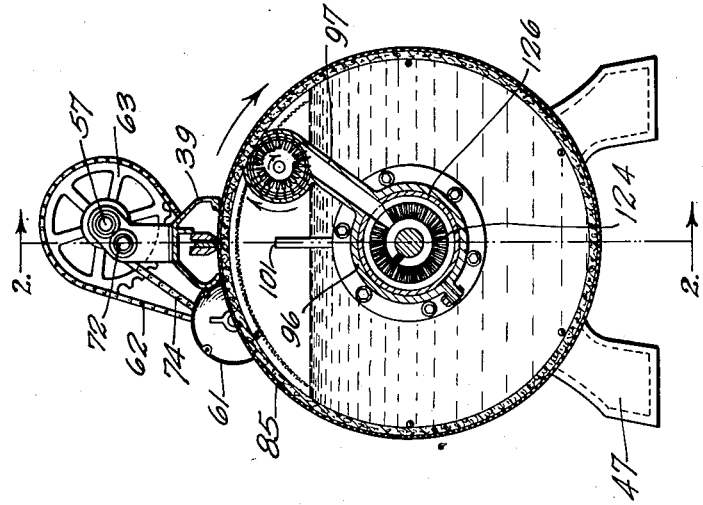
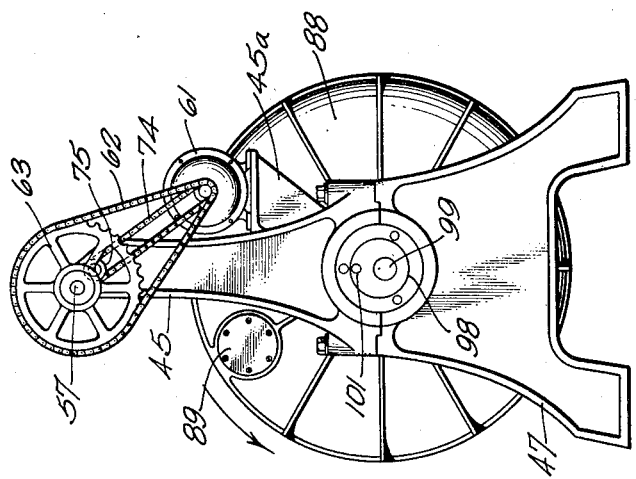
INVENTOR
Fred W Manning

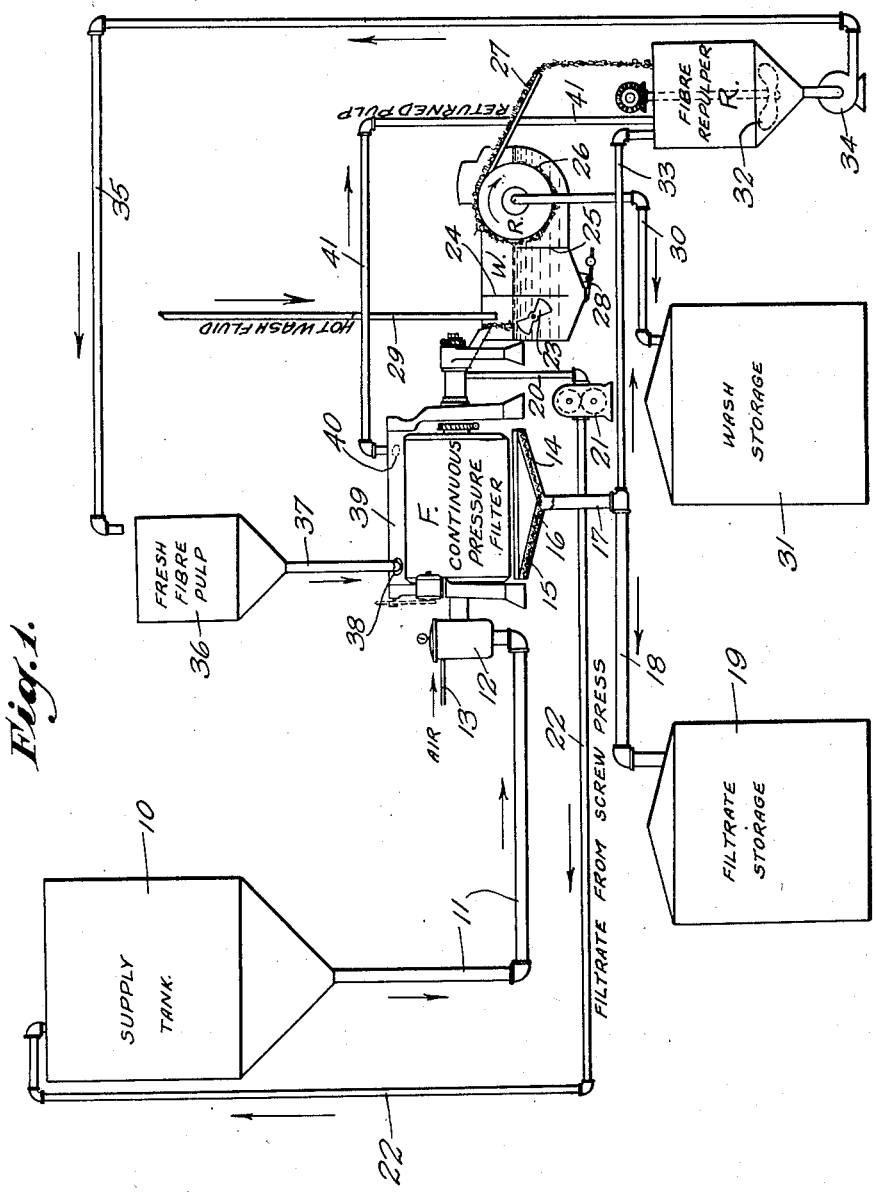

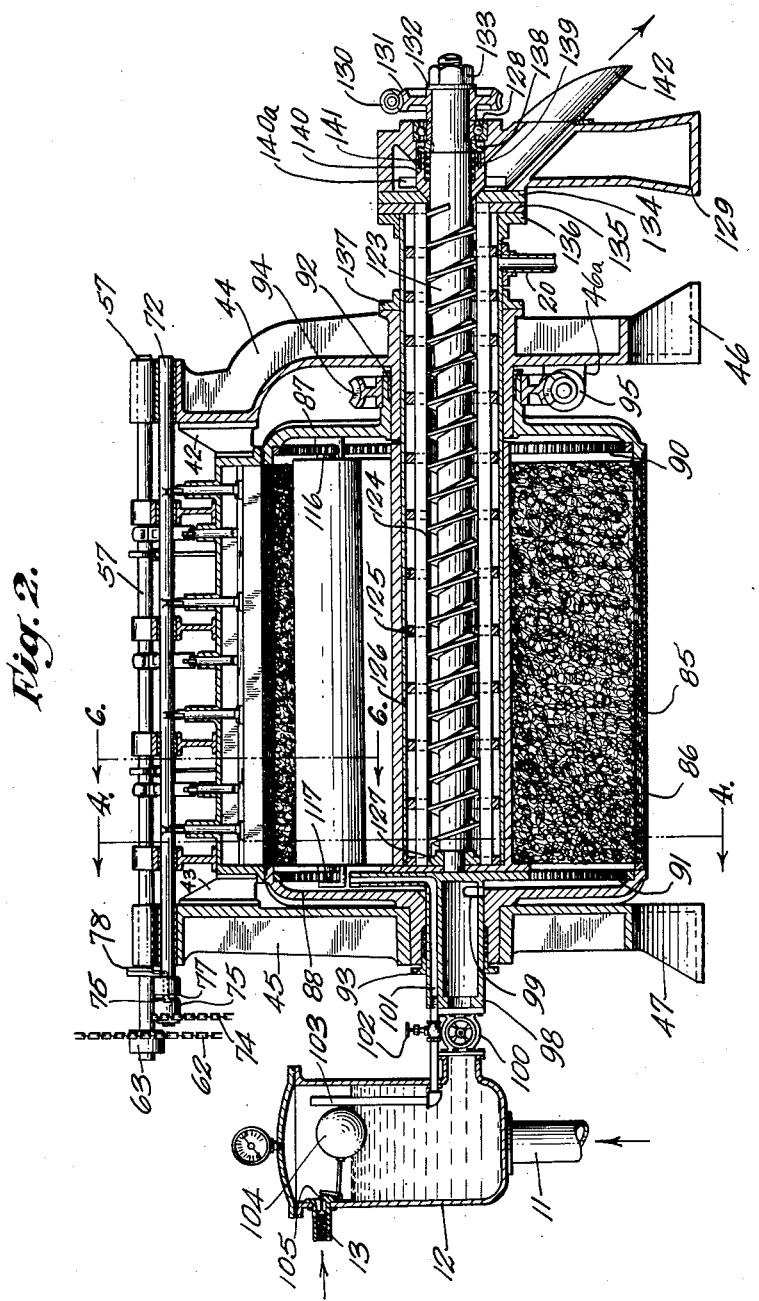

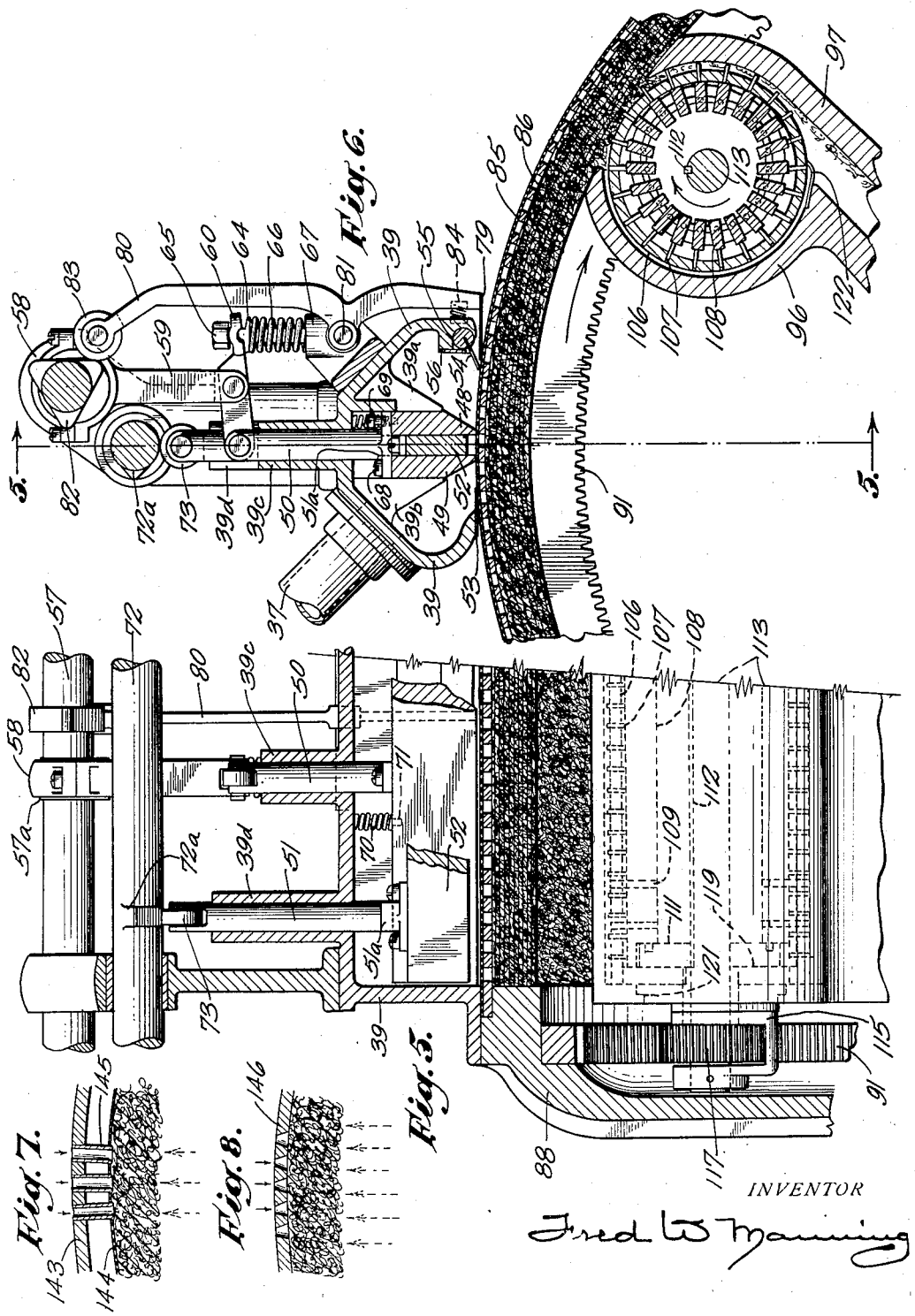

Patented Sept. 29, 1936

2,055,869

UNITED STATES PATENT OFFICE 2,055,869

PROCESS OF FILTRATION

Fred W. Manning, Altadena, Calif., assignor to F. W. Manning Company, Ltd., Los Angeles, Calif., a corporation Application March 11, 1932, Serial No. 598,119
Renewed January 19, 1935

16 Claims. (Cl. 210—199)

This invention relates to the process of continuous pressure filtration in which treating solids are moved continuously in one direction while the fluid being treated filters therethrough in a counter direction, and is especially applicable for such purposes as the clarifying of sugar liquors, the dewaxing of oils, etc.

It has been the practice heretofore to accomplish the clarification of liquids by means of the passage of the liquid through one thickness of woven or felted fabric, which was often given a thin pre-coating of some treating agent, such as kieselguhr, to increase the rate of filtrate flow and to prevent the impurities from entering the fabric. Considerable time is lost by such methods resulting from the necessity of returning the first of the filtrate for further filtration; the rate of filtrate flow is generally exceedingly slow due to the filter cake compactness necessary for the retention of all the impurities on or in one thickness of fabric, and its precoating if used; and the treating value of the agent separated concurrently is but very incompletely utilized before it must be discarded or removed for regeneration purposes. Furthermore, liquids require often to be handled at high pressures and temperatures, and such conditions have generally been found to be incompatible with continuous operations.

It is well known to those versed in the art of filtration, that the rate of filtrate flow can be greatly increased by increasing the porosity of the treating agent and avoiding compaction of the filter cake solids, and that clarity can be obtained with the increased porosity of the filter cake solids providing the depth of the latter is sufficiently increased, the clarity and rate of flow of the filtrate and the porosity and depth of the filter cake solids generally having definite relative values. It is also known that the amount of treating agent and wash fluids can be greatly reduced by counter-current treatment of the fluids and solids.

It is therefore an object of this invention to provide an improved method whereby a high rate of filtrate flow under low differential pressure can be continuously maintained through a filter bed of comparatively great depth, and without the aid of felted or woven fabrics; the usual filter cake forming period resulting in a contaminated filtrate, can be eliminated; the amount of treating agent and wash fluids reduced by counter-current operation; and the filter cake solids compacted and the entrained liquid expressed in a secondary operation.

In accordance with my invention, the treating agent in mixture with a portion of the filtered liquid or other liquid not deleterious to the fluid being filtered, is rapidly and continuously displaced from the filtrate side of an endless foraminous filter cake retaining wall, through the wall while the latter is in motion. This builds up a bed of treating solids, layer upon layer, on the fluid side of the retaining wall, the treating solids continuously moving in one direction while the liquid, or air for drying purposes, or a gaseous mixture from which a condensable constituent is to be extracted, etc., filters therethrough in the opposite direction. After the filter bed of treating solids has reached a predetermined thickness, a card continuously removes the contaminated or exhausted fluid inlet surface of the bed of treating solids to the same extent that fresh treating solids are added to the fluid outlet surface of the bed, and discharges it to a press which compacts and extrudes it from the machine. The treating solids can then be washed, and in mixture with a portion of the filtered liquid used over again.

The treating solids charged through the retaining wall as described above, may consist of cellulose and/or asbestos fibres, and such compressible solids may be impregnated by or mixed with, non-compressible treating solids such as fuller's earth, carbons, kieselguhr, salts of metals, etc., for decolorizing, catalyzing, combining with sulphur compounds, and for other purposes; or one treating solid may be introduced through the retaining wall in a counter-current filtering operation and another treating solid mixed with the unfiltered liquid and built upon the fluid inlet surface of the filter bed in a concurrent filtering operation.

I have found that fibres mixed with a liquid can be charged through a foraminous filter cake retaining wall from the filtrate side and retained on the fluid side, providing displacement of the fibres from one side of the wall to the other is sufficiently rapid, and the thinner the liquid with which the fibres are mixed the more rapid must be the displacement. If the charging pressure is not sufficiently higher than the filtering pressure, or the displacement of the fibres through the retaining wall is not sufficiently rapid, the fibres will not pass through the openings in the wall to the fluid side but will build into a filter bed on the filtrate side. Openings in the retaining wall $\frac{1}{16}''$ diameter are satisfactory for most purposes when fibre dust is used, but when the length of the fibres or the amount charged through the wall is increased the size of the openings can also be increased. Immediately after the rapid displacement of the fibres through a retaining wall, they mat or interlock together under the slower movement of the liquid moving in a counter direction, and this matting of the fibres prevents their egress or return through the openings. Other treating solids than fibres may be used but as a rule they will not mat or interlock over the openings as satisfactorily as fibres.

It will be understood throughout the specification and appended claims that a "filter cake or bed" may consist of either or both filtered solids and treating solids, and is a collection of disintegrated solids into a body or mass between a retaining wall and the fluid to be filtered; a "retaining wall" may be any fabric or structure, foraminous or otherwise, that will provide drainage for the fluid passing through the filter cake and at the same time retain the latter in position against the differential pressure necessary for passage of the fluid; and unless otherwise designated, "fluid and filtrate sides of a retaining wall" are the unfiltered and filtered fluid sides of the wall respectively.

The invention is exemplified in the following description, and one form of apparatus for carrying out the process is illustrated by way of example in the accompanying drawings, in which;

Fig. 1 is a diagrammatic layout of the filter system.

Fig. 2 is a vertical section of the filter taken on line 2—2 of Fig. 4.

Fig. 3 is an end elevation of the filter.

Fig. 4 is a cross section of the filter taken on line 4—4 of Fig. 2.

Fig. 5 is a vertical section of the plunger bar mechanism taken on line 5—5 of Fig. 6.

Fig. 6 is a cross section of the plunger bar mechanism and card taken on line 6—6 of Fig. 2.

Fig. 7 is a cross section of a modified construction of a portion of the filter cake retaining wall.

Fig. 8 is a cross section of a modified construction of a portion of the filter cake retaining wall.

Referring more specifically to the drawings by reference characters; Fig. 1 shows the supply tank 10 to be connected by pipe line 11 with the float tank 12 of the filter F, and to the float tank is also connected the air line 13. The filtered liquid is received in hopper 14, the inside of which is covered with a drainage screen and filter cloth 15 and 16 respectively, and the hopper is connected by pipe lines 17 and 18 with the filtrate storage tank 19. The filtrate from the compaction member of the filter flows through pipe line 20 to the pump 21, which delivers it through pipe line 22 to the supply tank for further filtration. The compacted solids from the filter are delivered to the wash tank W in which is situated agitator 23, baffle plates 24 and 25, wash drum 26, cake deflecting plate 27, the bottom outlet of the washer being closed by balance valve 28. A hot wash fluid is delivered through pipe line 29 to the washer, and the wash filtrate is discharged from the wash drum through pipe line 30 to the wash storage tank 31. The washed fibre solids are delivered to the fibre repulper R in which an agitator 32 mixes it with a portion of the filtered liquid discharged into the repulper from pipe line 33. Pump 34 returns the repulped fibre through pipe line 35 to the fresh fibre pump tank 36, and from the latter the pulp flows by gravity through pipe line 37 to the inlet 38 of the filter fibre feed box 39.

Figs. 2 to 6 inclusive, show the constructional de-to the repulper through outlet 40 and pipe line 41.

Fig. 2 to 6 inclusive, show the constructional details of the filter. The fibre charging box 39 is supported by brackets 42 and 43 bolted to the upper arms 44 and 45 of the filter drum supports 46 and 47 respectively; and is equipped with a number of brackets 39a and 39b for guiding the forward and after housing bars 48 and 49 respectively; bosses 39c for guiding the housing plunger rods 50; and bosses 39d for guiding the plunger bar rods 51, which drive the plunger bar 52. The box makes contact with the filter drum by means of a pressure plate 53, which is rigidly attached to the after edge of the box; and by a movable scraper plate 54 which is attached to an oscillatory rod 55 that is held in position in the forward edge of the box by a closure plate 56. The housing plunger rods are driven by the housing drive shaft 57 operating through eccentric portions 57a of the shaft, eccentric straps 58, eccentric rods 59, and fulcrum bars 60; and the housing drive shaft is driven by a motor 61 bolted to a bracket 45a, operating through a sprocket chain 62 and a sprocket wheel 63, which is keyed to the end of the shaft. The outer ends of the fulcrum bars are held in position between pivot plates 64 and the heads of the bolts 65, the pivot plates being supported by coil springs 66, which are centralized in the brackets 67 into which the bolts are tapped and which are bolted to the charging box. Screws 68 are used to attach the after housing bar rigidly to its driving rods, but screws 69 are tapped into the forward housing bar so as to give the latter a certain amount of play, springs 70, which are centralized by pins 71 that are driven into the forward housing bar, being relied upon to keep the forward housing bar in the most advanced position allowed by the screws. The plunger bar rods are driven by the plunger bar drive shaft 72 operating through cam projections 72a on the shaft, which strike the hardened steel rollers 73 in the ends of the plunger bar rods at the right moment thus giving the plunger bar its rapid forward movement. The return movement of the bar is caused by the housing bars in their backward movement, engaging with the shoulders 51a of the plunger bar rods. The plunger bar drive shaft is driven by the same motor as the housing bars drive shaft but at a much greater speed through sprocket chain 74 and sprocket wheel 75. This sprocket is loose on the plunger bar shaft and drives the latter only when engaged by a pin 76, which passes through a collar 77 that is keyed to the shaft, the movements of the pin being actuated by a grooved cam 78 keyed to the housing bars drive shaft.

A reciprocating plate 79, whose purpose is to move rapidly forward and backward under the scraping edge of the movable plate 54 and keep the latter free from fibres or other solids building up on its edge, is attached to rocker arms 80; and the latter are attached by pins 81 to the brackets 67, and are actuated by triangular cams 82 on the housing bars drive shaft, bearing against hardened steel rollers 83 in the upper ends of the rocker arms, the cams and rollers being kept in contact by coil springs 84 recessed into the lower ends of the rocker arms as well as into the forward edges of the charging box.

The filter drum consists of a light outer perforated shell 85, and an inner perforated shell 86, which is sufficiently heavy to withstand the internal pressure; and both are attached to the drum heads 87 and 88, one of the heads having a hand hole and cover plate 89 for the removal of the card. The inner rims of the drum heads are equipped with annular ring gears 90 and 91, and the hubs of the heads have stuffing boxes equipped with glands 92 and 93. A worm gear 94 is attached to the hub of one of the heads, and is driven by worm 95 from a source of power not shown, the worm being supported by bracket 46a. Upper and lower housing shells 96 and 97 respectively, form an enclosure for the card at their outer end from which a narrow passage leads to the compaction members, and to the end of this housing is attached a hollow shaft 98, which extends through the drum head 88. Passage 99 leads from the interior of the drum into the central opening in the shaft, and both are controlled by valve 100, which is bolted to the liquid outlet of the float chamber; and passage 101, which is separate from the main opening through the shaft, leads to the upper part of the filter drum and is controlled by valve 102 on the pipe line 103, which connects with the upper part of the float tank. A float 104 controls the needle valve 105 on the air line.

The card consists of a cylindrical shell 106 through the perforations of which move the carding spikes 107, which are assembled in the carding bars 108, the latter being constrained to move radially on the dowel pins 109, which are fixed rigidly in a radial position to the inside of the card shell. The turned portions of the ends of these bars move in the cam grooves of the stationary plates 110 and 111 which are fastened by key 112 one to each end of the card shaft 113, the latter being held in a stationary position by yokes 114 and 115 that are pinned to the ends of the shaft and fastened to the ends of the card housing. The small spur gears 116 and 117, which engage the annular ring gears of the drum heads, have sleeves to which the card end plates 118 and 119 respectively are attached. Removable end plates 120 and 121 are bolted to the ends of the card housing to permit withdrawal of the card from the housing though the handhole of the drum head. Scraper bar 122 is rigidly attached to the upper housing and bears against the entire length of the card cylinder.

The compaction member consists of compression screw 123, which is surrounded by bars 124 that are held in position by rings 125, and all are enclosed in pipe 126 to which the upper and lower halves of the card housing are clamped. Bearing 127, which is bolted to the end of the card housing, supports the inner end of the screw; and ball bearing 128, which is held in pedestal 129, takes the outer end of screw. The screw is driven by worm 130 from a source of power not shown, through worm gear 131 which is keyed to the screw shaft and held in position by washer 132 and nut 133. The thrust of the screw is transmitted from the nut through the washer, ball bearing, pedestal, end plate 134, end bar ring 135, angle ring 136, pipe 126, and angle ring 137, to the drum supports 44 and 46. Turning ring 138 which is fastened to the screw shaft, coil springs 139, and conical closure ring 140, form a resistant arrangement to the extrusion of the press cake. Pins 141 fixed to the turning ring causes the closure piece to turn with it and at the same time permits longitudinal movement of the latter. The wings 140a on the closure ring prevents any clogging of the press cake in the pedestal and causes it to be discharged from the latter through spout 142.

Fig. 7 shows a modified construction of the filter drum in which a heavy perforated cylindrical supporting wall 143 is placed externally of and at some distance from a lighter perforated cylindrical retaining wall 144, and the two maintained apart by means of distance ferrules 145. In this case the fresh fibres are introduced within the retaining wall through the ferrules in the direction of the full arrows while the greater portion of the liquid filters counter-currently into the annular space between the two walls in the direction of the dotted arrows. Fig. 6 shows a modified form of a single cylindrical wall 146 having conical perforations. These conical shaped perforations tend to distribute the fibres as they are introduced through the wall, and to cause a greater retarding of the egress movement of the fibres under the subsequent flow of the liquid moving in a counter direction, than if the perforations were straight. If desirable, the perforated drum shell can be wound with wire to withstand the internal pressure, in which case those parts of the fibre charging box adjacent to the shell can be made to fit down over the wires.

The operation of the apparatus thus constructed has been in part indicated in connection with the foregoing description. A liquid such as a wax distillate, which may have been previously treated as by chilling and into a portion of which a fibre has been mixed, flows from the supply tank 10 through pipe line 11 and the float chamber 12 into the filter under comparatively low pressure as for instance 5 to 15 pounds per square inch. Here the first filter cake is formed on the inside of drum by the liquid passing therethrough, the first of the filtrate being returned to the supply tank by means not shown for further filtration. After a filter cake of sufficient thickness has been built up, the fibre can be introduced thereafter into the filter drum through the perforations of the latter by means of the fibre charging box, and this counter-current method of introducing the fibres can be maintained as long as the apparatus remains in continuous operation.

Fibres charged into the filter drum counter-currently, are first mixed with a portion of the filtered liquid in the repulper R, then pumped to the fresh fibre pulp tank, from which they flow by gravity through pipe line 37 into the fibre charging box 39. The housing bars are driven into contact with the moving filter drum by means of the housing bars drive shaft 57 operating as explained above, causing the bars to touch the filter drum before the eccentric portions of the drive shaft had reached their extreme position, the coil springs 66 taking up the balance of the movement of the eccentrics. Immediately the housing bars touch the drum shell thereby trapping a predetermined amount of the fibre pulp, the grooved collar 78 on the housing bars drive shaft causes the movable pin 76 in the fixed collar 77 on the plunger bar drive shaft to engage with the hub of the driving sprocket 75. This results in a rapid forward movement of the plunger bar, which causes the entrapped fibre pulp to be driven or displaced through the perforations of the drum. The after housing bar is now retracted and in its return movement engages with the shoulders of the plunger bar drive rods 50, thereby lifting the plunger bar with it. During the first part of the return movement of the after housing and plunger bars, the forward housing bar is constrained by coil springs 70 to remain in contact with the filter drum until the play allowed by bolts 69 has been taken up, after which the forward housing bar is retracted sufficiently to allow any fibres not retained by the perforated plate, to pass. These fibres are removed from the surface of the drum by scraper 54 and doctor 79, which reciprocates rapidly under the edge of the latter, and due to the head maintained in the fresh fibre pulp tank, finally find their way through outlet 40 and return to the repulper. In this way a continuous circulation of the fresh fibre pulp through the fibre charging box is maintained.

After the fibre bed has built up to a predetermined thickness, the card removes the inner surface at a sufficient rate to maintain the depth of the bed constant. The card rotates in the same direction as the filter drum but at a much greater peripheral speed, the card bars being at their extreme outward position at the time their carding pins and the filter bed are in closest proximity, and being wholly retarded below the surface of the card cylinder before scraper 122 is reached. The card thus causes the contaminated treating fibres of the fluid inlet surface of the filter bed to be continuously removed at the same rate that fresh fibres are introduced through the perforated shell and added to the fluid outlet surface of the filter bed, and in addition removes continuously any adherent solids such as wax or other impurities, or other treating solids that may be removed from the fluid by its passage through the filter bed. This continuous carding action causes the carded solids to be discharged through the housing passage to the compaction screw, where the liquid is expressed under heavy pressure as for instance 500 to 3,000 pounds per square inch, and after passing out between the bars into pipe 126 along which it flows, is drawn through pipe 20 and returned by pump 21 to the supply tank for further filtration.

The extruded solids are discharged by the compaction screw into washer W operating at a higher temperature than the filter, where the wax is melted and the solids are broken up and agitated with hot water or a hot light hydrocarbon. Heavy treating solids such as fuller's earth may be settled by gravity and discharged automatically as they settle through a suitable balance valve 28. The wax will melt and in mixture with the wash liquid may be discharged into the wash storage tank, where the wax can be skimmed or decanted from a water wash or separated from a light hydrocarbon by distillation or decantation.

Instead of separating the wax from the fibre in a washer or save-all as described above, both may be discharged into a secondary pressure filter by means of a fibre charging box, and the wax removed from the fibre by a counter-current filtering action of a hot wash fluid; or the wax and fibre may be subjected to heat treatment to melt the wax after which both may be discharged into an extrusion press where the melted wax is separated from the fibre by compression, after which the fibres can be passed through a washer to completely remove all traces of wax residue; or the melting of the wax and expressing of the melted wax from the fibre can be accomplished in one operation in an extrusion press operating at a suitably high temperature.

If desirable, the filter bed may be subject to the drying action of air or other gaseous treating action before its fluid inlet surface is removed by the card. This can be accomplished by means of a float chamber, which otherwise is not required. As shown in Fig. 2, the liquid to be filtered enters the float chamber from pipe line 11 under pressure and in opposition to the air pressure entering the needle valve 105. The float maintains the required level of the liquid in the filter as shown in Fig. 4. If for any reason this level drops the float drops correspondingly thereby cutting off the air pressure and increasing the liquid supply. If the level rises the float likewise rises and by increasing the air pressure, retards the liquid supply. While I prefer to operate under filtering pressures of 5 to 15 pounds per square inch, higher pressures may be used if found desirable.

It will be obvious from the foregoing description that the process and apparatus just described has a general application wherever solids and fluids require to be contacted and separated; and that the apparatus may be modified in different ways to give the desired counter-current action between a solid and a fluid, as for instance, by building up the fluid outlet surface of the filter bed on the outside of a suction drum rotating in a bath of liquid to be filtered, by charging fresh treating solids through the foraminous drum shell from within, and removing the fluid inlet surface of the bed by means of an outside card and compaction member. Whatever arrangement is used to obtain the counter-current action, the treating solids must be charged rapidly through one portion of a foraminous filter cake retaining wall from its filtrate side to its unfiltered fluid side, while the fluid is passing through the filter bed of treating solids in the opposite direction on another portion of the retaining wall; or the charging and filtering operations must alternate with each other. However, as shown in Fig. 7, the passage through the retaining wall in opposite directions of solids and fluid may not necessarily be through the same openings.

In the foregoing example, I have described the operation of the apparatus in connection with the dewaxing of oils but it will be understood that the invention is equally applicable for many other purposes, and includes all such modifications as come within the scope of the appended claims.

I claim as my invention:

1. A filtering process which comprises passing a treating solid through a filter cake retaining wall to its fluid side, then treating the fluid with the said solid, and thereafter passing the treated fluid through the wall in a counter direction.

2. A filtering process comprising the rapid displacement of a treating solid through a filter cake retaining wall to its fluid side, treating the fluid by the solid displaced through the wall, and passing the treated fluid through the wall in a counter direction.

3. A filtering process which comprises depositing a treating solid on the fluid side of a filter cake retaining wall by passing the solid through the wall from its filtrate side, and thereafter treating the fluid by passing it through the deposited solid and retaining wall in a counter direction.

4. A filtering process which comprises depositing a treating solid on a filter cake retaining wall between the wall and the fluid to be treated by the rapid displacement of the solid through the wall from its filtrate side, and passing the fluid through the deposited solid and wall in a counter direction.

5. A filtering process which comprises depositing a treating solid on the fluid side of a filter cake retaining wall by passing the solid through the wall from its filtrate side under one pressure, and thereafter passing the fluid to be treated through the deposited solid and retaining wall in a counter direction and under a lesser pressure.

6. A filtering process which comprises continuously depositing a treating solid on the fluid side of a filter cake retaining wall by continuously passing the solid through successive portions of the wall from its filtrate side, and simultaneously passing the fluid to be treated in a counter direction through other successive portions of the wall on which the solid has been previously deposited.

7. A filtering process which comprises depositing a treating solid on the fluid side of a filter cake retaining wall by passing the solid through a portion of the wall from its filtrate side under a pressure opposing the pressure exerted to force the fluid to be treated through another portion of the wall in a counter direction.

8. A filtering process which comprises depositing a treating solid on the fluid side of a filter cake retaining wall by passing the solid through the wall from its filtrate side, moving the wall with the deposited solid, and passing the fluid through the deposited solid and wall in a counter direction.

9. A filtering process which comprises depositing a treating solid on the fluid side of a filter cake retaining wall by passing the solid in mixture with a previously treated portion of the fluid through the wall from its filtrate side, and thereafter passing the fluid to be treated through the deposited solid and retaining wall in a counter direction.

10. A filtering process which comprises depositing a treating solid on the fluid side of a filter cake retaining wall by passing the solid in mixture with a fluid through the wall from its filtrate side, and thereafter passing the fluid to be treated through the deposited solid and retaining wall in a counter direction.

11. A filtering process which comprises continuously depositing a treating solid in successive layers on the fluid side of a filter cake retaining wall by continuously passing the solid through successive portions of the wall from its filtrate side, simultaneously passing the fluid to be treated in a counter direction through other successive portions of the wall on which the solid has been previously deposited, and continuously removing the fluid inlet surface layer of the deposited solid with adherent solids to provide fresh filtering surface to the said fluid.

12. A filtering process which comprises continuously depositing a treating solid in successive layers on the fluid side of a filter cake retaining wall by continuously passing the solid through successive portions of the wall from its filtrate side, simultaneously passing the fluid to be treated in a counter direction through other successive portions of the wall on which the solid has been previously deposited, continuously removing the fluid inlet surface layer of the deposited solids with adherent solids to provide fresh filtering surface to the fluid to be treated, and continuously compacting the removed layer to extract the entrained fluid therefrom.

13. A filtering process which comprises continuously depositing a treating solid in successive layers on the fluid side of a filter cake retaining wall by continuously passing the solid through successive portions of the wall from its filtrate side, simultaneously passing the fluid to be treated in a counter direction through other successive portions of the wall on which the solid has been previously deposited, continuously removing the fluid inlet surface layer of the deposited solid with adherent solids to provide fresh filtering surface to the fluid to be treated, continuously compacting the removed layer to extract the entrained fluid therefrom, and returning the extracted fluid to the fluid side of the wall for further treatment.

14. A filtering process which comprises building up a filter cake of successive uniform layers of discrete treating solids in continuous spiral formation on a retaining wall, passing a fluid to be treated through the filter cake thus formed and retaining wall, removing the fluid inlet surface layer of the filter cake to provide fresh filtering surface to the said fluid, and interposing a fresh layer of discrete treating solids between the fluid outlet surface of the filter cake and the retaining wall.

15. A filtering process which comprises building up a filter cake of successive uniform layers of discrete treating solids in continuous spiral formation on a retaining wall, passing a fluid to be treated through the filter cake thus formed and retaining wall, continuously removing the fluid inlet surface layer of the filter cake to provide fresh filtering surface to the said fluid, and simultaneously interposing a fresh layer of discrete treating solids between the fluid outlet surface of the filter cake and the retaining wall.

16. A filtering process which comprises building up a filter cake of successive uniform layers of discrete treating solids in continuous spiral formation on a retaining wall, passing a fluid to be treated through the filter cake thus formed and retaining wall, continuously removing the fluid inlet surface layer of the filter cake to provide fresh filtering surface to the said fluid, and simultaneously interposing a fresh layer of discrete treating solids between the fluid outlet surface of the filter cake and retaining wall, the rate of removal and application of the said layers maintaining the number of layers in the filter cake, constant.

FRED W. MANNING.